W. W. NEIGHBOUR.
LOOM TEMPLE.
APPLICATION FILED SEPT. 6, 1919. RENEWED JULY 23, 1920.
1,355,770.
Patented Oct. 12, 1920.
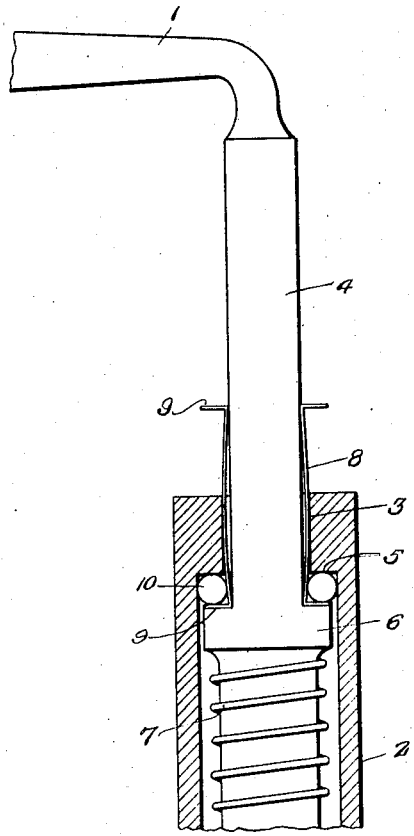
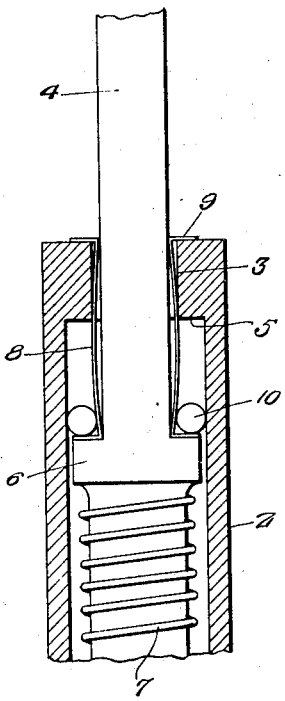
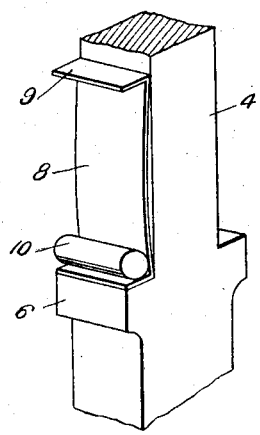
Inventor
W. W. Neighbour,
By Victor J. Evans
Attorney
WITNESSES

UNITED STATES PATENT OFFICE.

WILLIAM W. NEIGHBOUR, OF SPARTANBURG, SOUTH CAROLINA, ASSIGNOR OF ONE-HALF TO JOHN S. CROMER, OF SPARTANBURG, SOUTH CAROLINA.

LOOM-TEMPLE.

1,355,770.     Specification of Letters Patent.     Patented Oct. 12, 1920.

Application filed September 6, 1919, Serial No. 322,103. Renewed July 23, 1920. Serial No. 398,545.

*To all whom it may concern:*

Be it known that I, WILLIAM W. NEIGHBOUR, a citizen of the United States, residing at Spartanburg, in the county of Spartanburg and State of South Carolina, have invented new and useful Improvements in Loom-Temples, of which the following is a specification.

The object of my present sole invention is the provision of a loom temple embodying a construction whereby friction and consequent wear of parts are reduced to a minimum, and the temple head is held against sidewise tipping, and the temple is adapted to operate without the application of oil thereto; oil being objectionable because it frequently gets upon and spoils fabric in course of manufacture.

To the attainment of the foregoing, the invention consists in the improvement as hereinafter described and definitely claimed.

In the accompanying drawings, hereby made a part hereof:

Figure 1 is a view, partly in plan and partly in horizontal section, of the temple constituting the best practical embodiment of my invention of which I am cognizant.

Fig. 2 is a similar view showing the temple shank in a different position relatively to the temple casing.

Fig. 3 is a detail perspective, fragmentary in character, and showing the arrangement of one roller and one plate relatively to the shank of the temple head.

Similar numerals of reference designate corresponding parts in all of the views of the drawings.

The temple head 1 and the casing 2 are not of the essence of my invention, and may therefore be of any construction compatible with the purpose of the invention. The casing is provided in its forward end with an aperture 3 for the play of the shank 4, and is also provided back of said aperture with abutments 5. The shank or bar 4 is provided at an intermediate point of its length with an enlargement 6, and back of the said enlargement the usual cushioning spring 7 is arranged about the bar, as illustrated; said spring being interposed in the usual manner between the enlargement 6 and a rear abutment in the casing 2.

Interposed between opposite sides of the shank or bar 4 and opposed walls of the aperture 3, are plates 8 which have flanges 9 at their ends extending at right angles in a direction away from the sides of the shank or bar 4. The said plates or strips 8 are of thin metal and are concavo-convex or bowed slightly outward in the direction of their length, so as to exert yielding pressure against the walls of the aperture 3. Bearing against the plates or strips 8 and the walls of the casing 2 are anti-friction rollers 10. Said anti-friction rollers are interposed between the inner flanges 9 of the plates 8 and the abutments at the inner side of the aperture 3.

In the ordinary use of loom temples, the wear on the end of the temple frame or casing and the upper and lower corners of the temple bar or shank 4 permits of objectionable tipping of the temple heads. This objection is effectually overcome by the interposition of the plates or strips 8 between the shank or bar 4 and the forward end of the casing 2. The rollers 10 reduce the friction incidental to movements of the shank or bar 4 relatively to the casing 2 to a minimum. The inner flanges or lips 9 of the plates or strips 8 limit the inward movements of the rollers 10, Fig. 2, and the outer flanges or lips 9, by bringing up against the end of the casing 2, limit the inward movements of the plates 8. Notwithstanding the bringing up of the flanges 9 against the forward end of the casing 2, the temple shank 4 may be moved rearwardly between the plates 8 without injury to any of the parts.

It will be apparent from the foregoing that my improvement is adapted to be prevent sidewise tipping of the temple, and is also adapted to assure free movement of the temple head and shank without the use of lubricant and without undue frictional wear of the parts.

Having described my invention, what I claim and desire to secure by Letters Patent, is:

1. In a temple, the combination of a casing apertured at its forward end, a temple shank or bar movable rectilinearly in said casing, longitudinally bowed strips interposed between opposite sides of the shank and the opposed walls of the aperture and having outwardly directed flanges at their ends, and anti-friction rollers arranged between the inner flanges of the strip and the forward end of the casing.

2. In a loom temple, the combination of a casing apertured at its forward end, a temple shank movable rectilinearly in said aperture, plates interposed between the shank and walls of the aperture and having flanges, and anti-friction rollers within the casing and interposed between the inner flanges of the plates and the forward portion of the casing.

3. In a loom temple, the combination of an apertured casing, a temple movable rectilinearly through the aperture of the casing, and yielding wear-preventing means interposed between the temple shank and the wall of the aperture in the casing and movable rectilinearly through said aperture.

4. In a loom temple, the combination of an apertured casing, a temple shank movable rectilinearly in the aperture, and wear-preventing means movable with the shank through the aperture of the casing and equipped with means to bring up against the outer end of the casing.

5. In a loom temple, the combination of an apertured casing, a temple shank movable rectilinearly in the aperture, and wear-preventing means movable with the shank through the aperture of the casing and equipped with means to bring up against the outer end of the casing and also equipped with anti-friction rollers confined between their inner portions and the casing.

In testimony whereof I affix my signature.

WILLIAM W. NEIGHBOUR.